United States Patent
Chen

(10) Patent No.: US 11,455,534 B2
(45) Date of Patent: Sep. 27, 2022

(54) DATA SET CLEANING FOR ARTIFICIAL NEURAL NETWORK TRAINING

(71) Applicant: MACRONIX INTERNATIONAL CO., LTD., Hsinchu (TW)

(72) Inventor: Shih-Hung Chen, Jhudong (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 347 days.

(21) Appl. No.: 16/896,942

(22) Filed: Jun. 9, 2020

(65) Prior Publication Data

US 2021/0383210 A1 Dec. 9, 2021

(51) Int. Cl.
*G06N 3/08* (2006.01)
*G06N 20/00* (2019.01)
*G06N 3/04* (2006.01)
*G06K 9/00* (2022.01)
*G06K 9/62* (2022.01)

(52) U.S. Cl.
CPC .......... *G06N 3/08* (2013.01); *G06K 9/00503* (2013.01); *G06K 9/6256* (2013.01); *G06N 3/0454* (2013.01); *G06N 20/00* (2019.01)

(58) Field of Classification Search
None
See application file for complete search history.

(56) References Cited

U.S. PATENT DOCUMENTS

| | | |
|---|---|---|
| 8,909,568 B1 | 12/2014 | Mann et al. |
| 8,924,313 B2 | 12/2014 | Chidlovskii |
| 10,339,468 B1 | 7/2019 | Johnston et al. |
| 10,529,317 B2* | 1/2020 | Lee .......... G06N 3/084 |
| 10,540,606 B2 | 1/2020 | Dirac et al. |
| 2014/0279734 A1 | 9/2014 | Forman |
| 2021/0125001 A1* | 4/2021 | Guo .......... G06K 9/6262 |
| 2022/0156577 A1* | 5/2022 | Jha .......... G06K 9/623 |

OTHER PUBLICATIONS

Arlot, et al., "A survey of cross-validation procedures for model selection," Statistics Surveys, vol. 4, Jan. 2010, pp. 40-79.
Chen, et al., "Understanding and utilizing deep neural networks trained with noisy labels," International Conference on Machine Learning May 24, 2019, pp. 1-13.
Krueger, et al., "Fast Cross-Vallidation via Sequential Testing," J. Mach. Learn. Res., Feb. 2016 pp. 1-54.

* cited by examiner

*Primary Examiner* — Dov Popovici
(74) *Attorney, Agent, or Firm* — Andrew L. Dunlap; Haynes Beffel & Wolfeld LLP

(57) ABSTRACT

A technology for cleaning a training data set for a neural network using dirty training data starts by accessing a labeled training data set that includes relatively dirty labeled data elements. The labeled training data set is divided into a first subset A and a second subset B. The procedure includes cycling between the subsets A and B, including producing refined model-filtered subsets of subsets A and B to provide a cleaned data set. Each refined model-filtered subset can have improved cleanliness and increased numbers of elements.

20 Claims, 11 Drawing Sheets

DATA SET CLEANING FOR ARTIFICIAL NEURAL NETWORK TRAINING

BACKGROUND

Field

The present invention relates to cleaning data used for training neural networks and for training neural networks using the cleaned data.

Description of Related Art

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches which, in and of themselves, can also correspond to implementations of the claimed technology.

Neural networks, including deep neural networks, are a type of artificial neural networks (ANNs) that use multiple nonlinear and complex transforming layers to successively model high-level features. Neural networks provide feedback via backpropagation which carries the difference between observed and predicted output to adjust parameters. Neural networks have evolved with the availability of large training datasets, the power of parallel and distributed computing, and sophisticated training algorithms. Neural networks have facilitated major advances in numerous domains such as computer vision, speech recognition, and natural language processing.

Convolutional neural networks (CNNs) and recurrent neural networks (RNNs) can be configured as deep neural networks. Convolutional neural networks have succeeded particularly in image recognition with an architecture that comprises convolution layers, nonlinear layers, and pooling layers. Recurrent neural networks are designed to utilize sequential information of input data with cyclic connections among building blocks like perceptrons, long short-term memory units, and gated recurrent units. In addition, many other emergent deep neural networks have been proposed for limited contexts, such as deep spatio-temporal neural networks, multi-dimensional recurrent neural networks, and convolutional auto-encoders.

The goal of training deep neural networks is optimization of the weight parameters in each layer, which gradually combines simpler features into complex features so that the most suitable hierarchical representations can be learned from data. A single cycle of the optimization process is organized as follows. First, given a training dataset, the forward pass sequentially computes the output in each layer and propagates the function signals forward through the network. In the final output layer, an objective loss function measures error between the inferenced outputs and the given labels. To minimize the training error, the backward pass uses the chain rule to backpropagate error signals and compute gradients with respect to all weights throughout the neural network. Finally, the weight parameters are updated using optimization algorithms based on stochastic gradient descent. Whereas batch gradient descent performs parameter updates for each complete dataset, stochastic gradient descent provides stochastic approximations by performing the updates for each small set of data examples. Several optimization algorithms stem from stochastic gradient descent. For example, the Adagrad and Adam training algorithms perform stochastic gradient descent while adaptively modifying learning rates based on update frequency and moments of the gradients for each parameter, respectively.

In machine learning, classification engines including ANNs are trained using a training set, comprising a database of data examples labeled according to features to be recognized by the classification engines. Usually, some of the data examples used as the elements in a training set are labeled incorrectly. In some training sets, a substantial number of elements are labeled incorrectly. Incorrect labeling can interfere with the learning algorithms used to generate the models, resulting in poor performance.

It is desirable to provide a technology to improve training of ANNs using training sets with incorrectly labeled elements.

SUMMARY

A computer implemented method for cleaning a training data set for a neural network is described, along with a computer system and computer program product that comprise computer instructions configured to execute the method. A neural network deployed in an inference engine, trained using the technology described herein, is provided.

A technology for cleaning a training data set for a neural network, using dirty training data, starts by accessing a labeled training data set that can be dirty. The labeled training data set is divided into a first subset A and a second subset B. The procedure includes cycling between the subsets A and B, including producing refined model-filtered subsets of subsets A and B to provide a cleaned data set. Each refined model-filtered subset can have improved cleanliness and increased numbers of elements.

In general, a procedure described herein includes accessing a labeled training data set (S) that comprises relatively dirty labeled data elements. The labeled training data set is divided into a first subset A and a second subset B. The procedure includes, in cycle A, using the first subset A to train a model MODEL_A of a neural network, and filtering the second subset B of the labeled training data set using the model MODEL_A. A model-filtered subset B1F of subset Be is provided that has a number of elements that depends on the accuracy of the MODEL_A. Then, the next cycle, cycle AB, includes using the model-filtered subset B1F to train a model MODEL_B1F, and filtering the first subset A of the labeled training data set using the model MODEL_B1F. The model MODEL_B1F may have better accuracy than the model MODEL_A. This results in a refined model-filtered subset A1F of subset A that has a number of elements that depends on the accuracy of MODEL_B1F. Another cycle, cycle ABA, can be executed which includes using the refined model-filtered subset A1F to train a model MODEL_A1F, and filtering the second subset B of the labeled training data set using the model MODEL_A1F. The model MODEL_A1F may have a better accuracy than the model MODEL_A. This results in a refined model-filtered subset of B2F of subset B that has a number of elements that depends on the accuracy of MODEL_A1F, and can have a greater number of elements than model-filtered subset B1F.

In embodiments described herein, the cycling can continue until the refined model-filtered subsets satisfy an iteration criterion based, for example, on data quality or maximum cycle numbers.

A combination of the refined model-filtered subsets from subset A and subset B can be combined to provide a cleaned training data set. The cleaned training data set can be used to train an output model for a target neural network having a level of accuracy improved over training with the original training data set. The target neural network with the output model can be deployed in an inference engine.

As used herein, a "subset" of a set excludes the degenerate cases of a null subset and a subset that includes all members of the set.

Other aspects and advantages of the present invention can be seen on review of the drawings, the detailed description and the claims, which follow.

DETAILED DESCRIPTION

A detailed description of embodiments of the present invention is provided with reference to the FIGS. 1-15.

Figure 1:
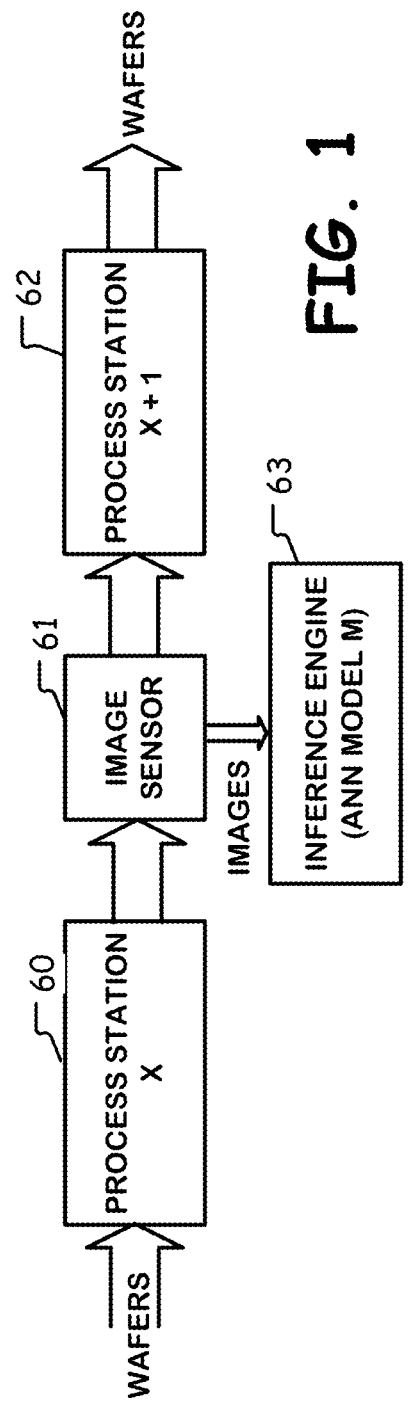
FIG. 1 is a simplified diagram of a manufacturing assembly line deploying an artificial neural network for defect classification.

FIG. 1 is a simplified diagram of a manufacturing assembly line including process station 60, image sensor 61 and process station 62. In the manufacturing line, integrated circuit wafers are input to process station X, and subject to a process such as deposition or etching, and output to an image sensor 61. From the image sensor the wafers are input to process station X+1, where they are subject to a process such as deposition, etching or packaging. Then, the wafers are output to a next stage. The images from the image sensor are supplied to an inference engine 63 that includes an ANN trained according to the technology described herein, which identifies and classifies defects in the wafers. The inference engine may receive images for other stages in the manufacturing process as well. This information about defects in the wafers sensed at the image sensor 61 can be applied to improve the manufacturing process, such as by adjusting the process executed at process station X or in other stations.

As mentioned above, a method for training a neural network to classify defects in a manufacturing line, or for other classification functions can include a computer implemented process of cleaning the training data set, by removing mislabeled elements.

Images of defects on integrated circuit assemblies taken in a manufacturing assembly line can be classified in many categories, usable as elements of a training data set. These defects vary significantly in counts for a given manufacturing process, and so the training data can have an uneven distribution, and includes large data sizes. Also, the labeling process for images like this may be done by a person, who can make significant numbers of errors. For example, to build up a new neutral network model to classify defect categories or types, first we need to provide a labeled image database for training. The image database includes the defect information. One might have 50,000 defect images in the database, and with each image labeled by human with a classification. So one image in the set might be classified as category 9, and another image in the set might be classified as category 15 . . . , etc. However, human error and ambiguous cases result in mislabeling. For example, one image in the set which should be classified as defect category 7, might be erroneously classified the into category 3. A data set with erroneously classified elements can be referred to as a dirty data set, or a noisy data set.

An embodiment of the technology described herein can be used to clean a dirty data set, and use the cleaned data set to train an ANN to recognize and classify the defects, improving the manufacturing process. This trained ANN can be used to monitor in-line process defects used, for example, to evaluate the stability and quality of in-line products, or the life of manufactured tools.

Figure 2A:
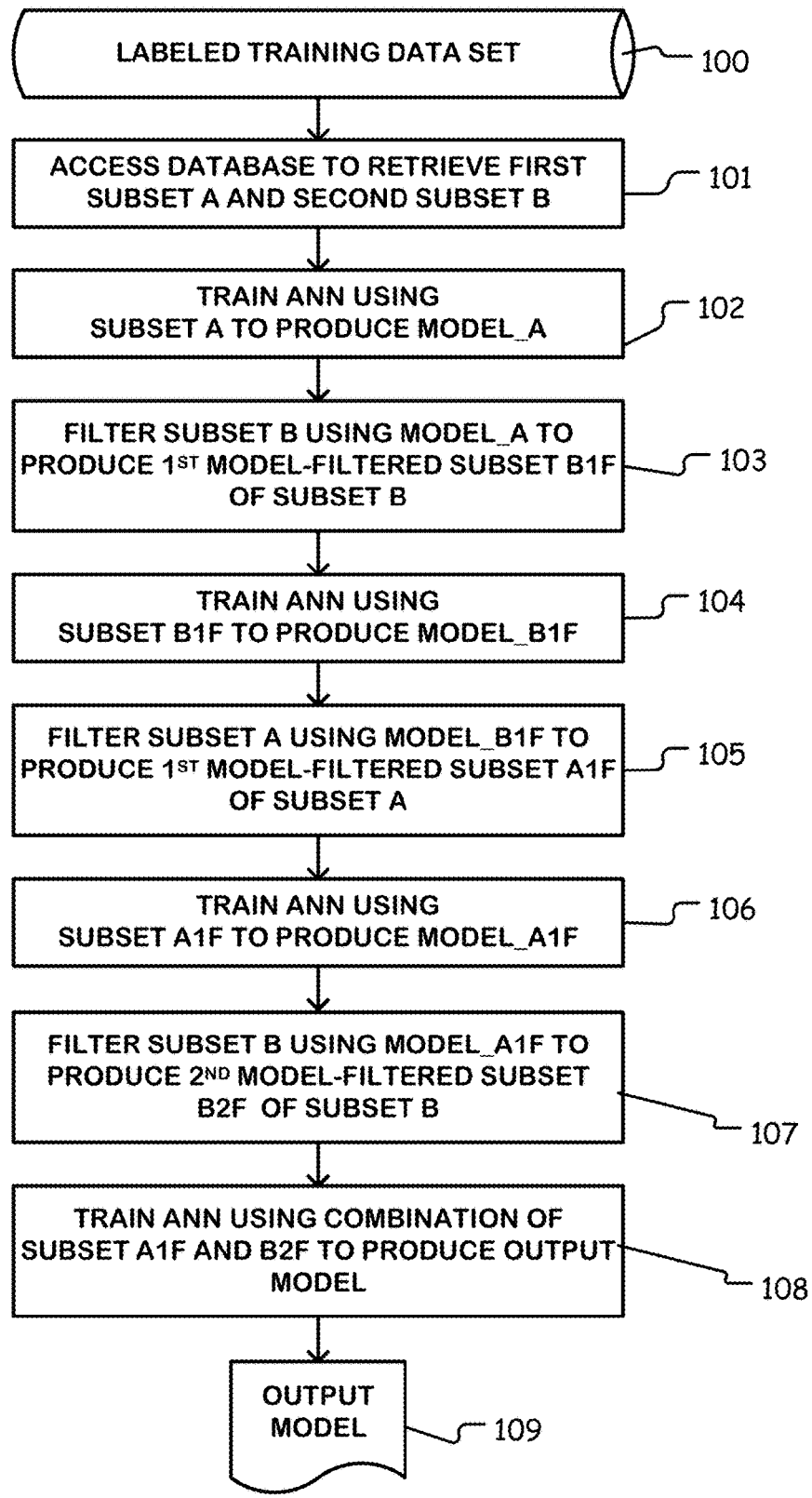
FIG. 2A is a flow chart showing a method for filtering a training data set, and training a model for an ANN using the filtered training data set.

FIG. 2A is a flowchart illustrating a computer-implemented process for training a neural network ANN starting with "dirty" training data. The flowchart begins with providing a labeled training data set S (100), which may be stored in a database accessible to the processor or processors executing the process. An example labeled training data set can include thousands or tens of thousands (or more) of images, labeled as discussed above, or any other type of training data selected according to the mission function of the neural network to be implemented.

The computer implemented process accesses the database to retrieve a first Subset A and a second Subset B of the training data set S (101). In one approach, Subset A and Subset B are selected so that the distribution of dirty data elements in the subset is about equal to the distribution in the overall data set S. Also, the Subset A and Subset B can be selected so that the numbers of data elements in each of the subsets is about the same. As it is desirable to maximize the number of clean data elements utilized in a training algorithm, Subset A and Subset B can be selected by dividing the training data set S equally, randomly selecting the elements for Subset A and Subset B so as to at least statistically maintain the distribution of dirty elements relatively equal in the two subsets.

Figure 3:
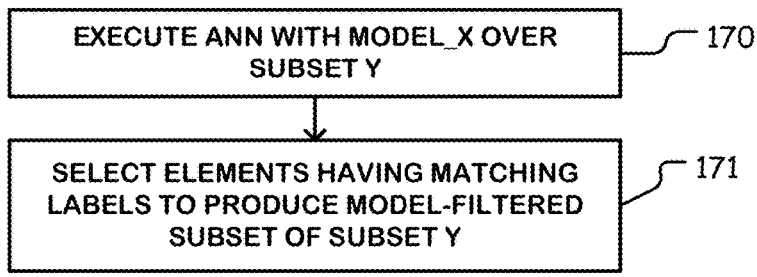
FIG. 3 illustrates a technique usable for filtering intermediate data subsets in methods like those shown in FIGS. 2A and 2B.

Next in the flowchart (cycle A), one of the two subsets, such as Subset A, is used to train the neural network to produce a model MODEL_A (102). Using the model MODEL_A, Subset B is filtered to produce, and store in memory, a first model-filtered Subset B1F of Subset B (103) (first Subset B filtering). An example of a technique for filtering a subset using a model is illustrated in FIG. 3. The model-filtered Subset B1F includes elements of Subset B for which the labeling matches the inference results from the neural network executing model MODEL_A. As a result of this filtering, the model-filtered Subset B1F should have fewer overall elements, and a lower percentage of mislabeled elements than Subset B.

Next (cycle AB), the model-filtered Subset B1F is used to train the neural network to produce a refined model MODEL_B1F (104). As used herein, the term "refined" is used to indicate that the model was produced using a model-filtered subset (or a refined model-filtered Subset A as in instances below), and does not indicate any relative quality measure of the model. Then, Subset A is filtered, using the refined model MODEL_B1F, to produce and store in memory, a refined model-filtered Subset A1F of Subset A (105) using, for example, the technique described with reference to FIG. 3 (first Subset A filtering). The refined model-filtered Subset A1F includes elements of Subset A for which the labeling matches the inference results from the neural network executing refined model MODEL_B1F. As a result of this filtering, the refined model-filtered Subset A1F may have fewer overall elements and a lower percentage of mislabeled elements than Subset A.

In a next iteration (cycle ABA), the refined model-filtered Subset A1F is used to train the neural network to produce, and store in memory, a refined model MODEL_A1F (106). Then, the refined model MODEL_A1F is used to filter Subset B to produce, and store in memory, a second refined model-filtered Subset B2F of Subset B (107), using for example a technique like that described in FIG. 3 (second Subset B filtering). The second refined model-filtered Subset B2F may have a larger number of elements than the first refined model-filtered Subset B1F of Subset B and a lower percentage of mislabeled elements than the first refined model-filtered Subset B1F.

In this example, no additional filtering cycles may be needed to provide a cleaned training data set to be used in producing a final output model. For example, the cleaned training data set at this stage can comprise a combination of the second refined-model-filtered Subset B2F of Subset B and the first refined-model-filtered Subset A1F of Subset A.

If no additional filtering cycles are executed, then the computer implemented algorithm can train a neural network using the combination of refined model-filtered subsets, such as a union of Subset A1F and Subset B2F, to produce an output model for the neural network (108). The neural network trained at this stage using the cleaned data set can be the same neural network as used in steps 102, 104 and 106 to produce the refined model-filtered subsets, or it can be a different neural network. The output model can then be stored in an inference engine to be applied in the field, or in memory such as a database, for later use (109).

In the training steps of FIG. 2A (102, 104, 106), in some embodiments, only parts of the subsets or filtered subsets may be used as training data to reduce processing resources required.

Figure 2B:
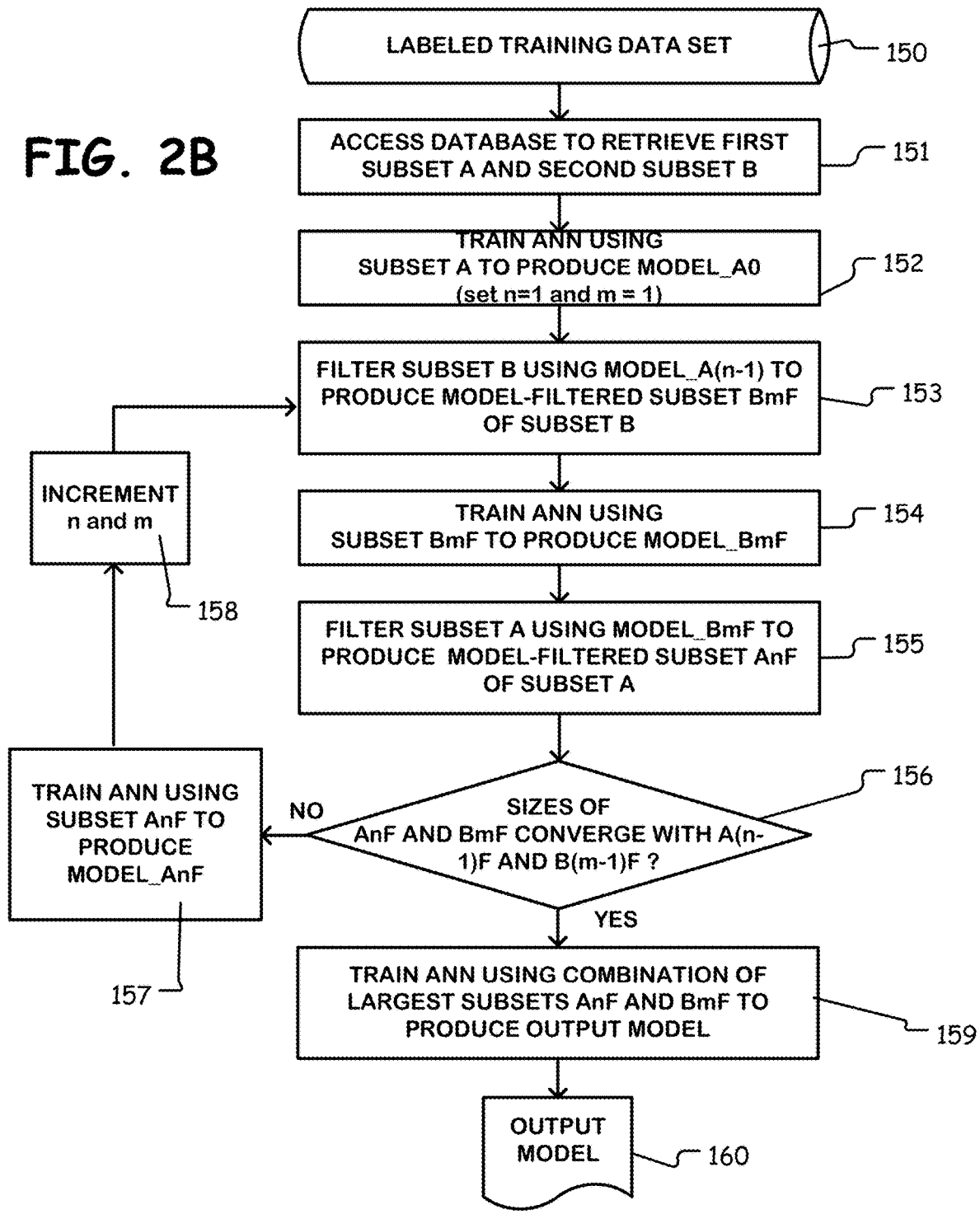
FIG. 2B is a flow chart showing another method for filtering a training data set, and training a model for an ANN using the filtered training data set.

FIG. 2B is a flowchart illustrating a computer-implemented process for training a neural network ANN starting with "dirty" training data, extending the procedure iteratively to additional cycles (A, AB, ABA, ABAB, ABABA, etc.). The flowchart begins with providing a labeled training data set S (150), which may be stored in a database accessible to the processor or processors executing the process. An example labeled training data set can include thousands or tens of thousands (or more) of images, labeled as discussed above, or any other type of training data selected according to the mission function of the neural network to be implemented.

The computer implemented process accesses the database to retrieve a first Subset A and a second Subset B of the training data set S (151). In one approach, Subset A and Subset B are selected so that the distribution of dirty data elements in the subset is about equal to this distribution in the overall data set S. Also, the Subset A and Subset B can be selected so that the numbers of data elements in each of the subsets are the same, or about the same. As it is desirable to maximize the number of clean data elements utilized in a training algorithm, Subset A and Subset B can be selected by dividing the training data set S equally, randomly selecting the elements for Subset A and Subset B so as to at least statistically tend to maintain the distribution of dirty elements relatively equal in the two subsets. Other techniques for selecting the elements of Subset A and Subset B can be applied taking into account the numbers of elements in each category, and other data-content-aware selection techniques.

Next, in the flowchart, one of the two subsets, such as Subset A is used to train the neural network to produce a model MODEL_A(0), and indexes for tracking the cycles are set (n=1 and m=1) (152). Using the model MODEL_A (n−1), Subset B is filtered to produce, and store in memory, a first model-filtered Subset BmF of Subset B (103). An example of a technique for filtering a subset using a model is illustrated in FIG. 3. The model-filtered Subset BmF includes elements of Subset B for which the labeling matches the inference results from the neural network executing model MODEL_A(n−1). As a result of this filtering, the model-filtered Subset BmF should have fewer overall elements, and a lower percentage of mislabeled elements than Subset B.

Next, the model-filtered Subset BmF is used to train the neural network to produce a refined model MODEL_BmF (154). Then, Subset A is filtered, using the refined model MODEL_BmF, to produce, and store in memory, a refined model-filtered Subset AnF of Subset A (155), using, for example, the technique described with reference to FIG. 3. The refined model-filtered Subset AnF includes elements of Subset A for which the labeling matches the inference results from the neural network executing refined model MODEL_BmF. As a result of this filtering, the refined model-filtered Subset AmF may have fewer overall elements and a lower percentage of mislabeled elements than Subset A.

At this stage, the procedure determines whether an iteration criterion is met. For example, an iteration criterion can be a maximum number of cycles, as indicated by whether the index n or the index m exceeds a threshold. Alternatively, the iteration criterion can be whether the sizes (i.e. numbers of elements) of the refined model-filtered subsets AnF and BmF converge with the sizes of the filtered subsets A(n−1)F and B(m−1)F, respectively (156). Convergence can be indicated for example if the difference in sizes is less than a threshold, where the threshold can be selected according to the particular application and training data set used. For example, the threshold can be on the order of 0.1% to 5%.

As explained with reference to FIG. 2A, the cycles can have a fixed number, without requiring an iteration criterion, so that at least one refined model-filtered subset is provided, and preferably at least one refined model-filtered subset of each of subset A and subset B is provided.

In the case of FIG. 2B, if the sizes are not converging, or other iteration criterion is not met, then the refined model-filtered Subset AnF is used to train the neural network to produce, and store in memory, a refined model MODEL_AnF (157). The process proceeds to increment the indexes n and m (158) and returns to block 153, where the just produced refined model MODEL_A(n−1)F is used to filter Subset B.

The procedure continues until the iteration criterion of step 156 is met. If the criterion is met at step 156, then refined model-filtered subsets of Subset A and of Subset B are selected. For example, the refined model-filtered subsets having the largest numbers of elements can be selected. The selected model-filtered subsets of Subset A and Subset B are combined to provide a cleaned data set, and the combination is used to train a target neural network to produce an output model (159). The target neural network trained at this stage using the cleaned data set can be the same neural network as used in steps 152, 154 and 157 to produce the refined model-filtered subsets, or it can be a different neural network.

Then the output model can be stored in an inference engine to be applied in the field, or in memory such as a database, for later use (160).

In the training steps of FIG. 2B (152, 154 and 157), in some embodiments, only parts of the subsets or filtered subsets may be used as training data to reduce processing resources required.

In general, the procedure shown in FIG. 2B includes an example of a procedure comprising (i) using a previously provided refined model-filtered subset of one of the first subset and second subset to train an instant refined model of the neural network;

(ii) filtering another of first subset and second subset using the instant refined model to provide an instant refined model-filtered subset of the other of the first subset and the second subset; and (iii) determining whether an iteration criterion is met, and if not, then executing (i) to (iii), and if so, then using a combination of a selected one of the refined model-filtered subsets of the first subset (A) and a selected one of the model-filtered subsets of the second subset (B) to produce a trained model for the neural network.

FIG. 3 illustrates a technique for filtering a subset of the training set using a model of a neural network, as done in FIGS. 2A and 2B steps 103, 105, 107, 153 and 155.

Assuming that a MODEL_X is provided, the process uses MODEL_X (trained using one subset of the training data set) and executing the neural network over subset Y (170). MODEL_X can be MODEL_A, MODEL_B1F, MODEL_A1F or, more generally, MODEL_A(n)F or MODEL_B(m)F. The subset Y is the subset (the other subset) not used to train the MODEL_X.

Then, elements of the subset Y having labels that match the classification data output by the neural network are selected as members of the model-filtered subset of subset Y (171).

The technology can be further described with reference to FIGS. 4 to 13, which are charts illustrating characteristics of the training data set and subsets.

Figure 4:
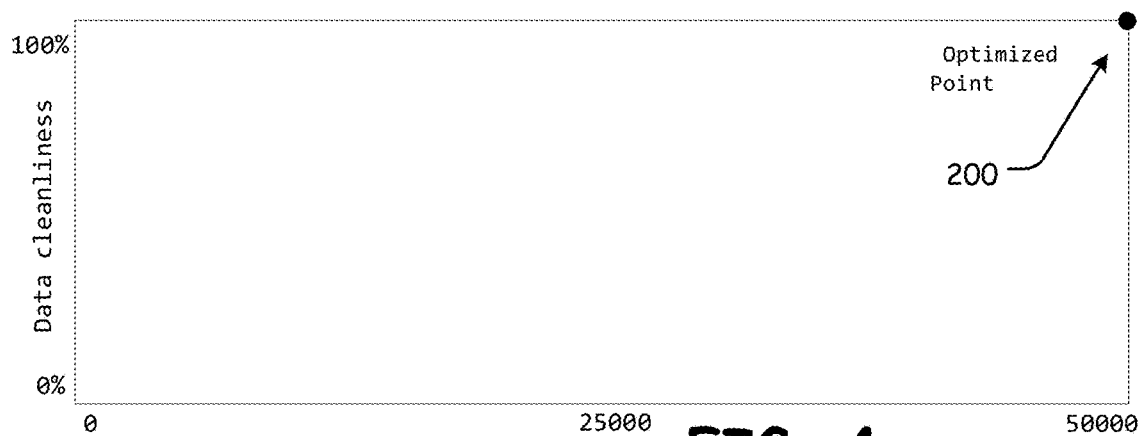
FIG. 4 is a chart plotting data cleanliness versus count of elements in training data, usable to illustrate correlations between cleanliness, element count and resulting trained model performance.

FIG. 4 is a chart representing a training data set S (e.g. benchmark file CIFAR 10 with 20% noise) showing data cleanliness on the y-axis and numbers of elements of the training data set S on the X axis. It can represent, for example, a data set of 50,000 elements, the data cleanliness of which can range from 0 to 100%. Any particular data point X, Y is an indication of the number of elements of the set, and the data cleanliness of the set. In general, a training data set having more elements, extending out the X axis, produces more accurate models. Also, the training data set having more cleanliness, extending up the y-axis, produces more accurate models. The training data set will have an optimal point 200, where the maximum number of data elements, with the maximum data cleanliness, includes 100% of the training data set S. Ideally, if a training data set can be characterized by the optimal point 200, then the quality of a neural network trained using the data set will be the best possible based on this training set.

Figure 5:
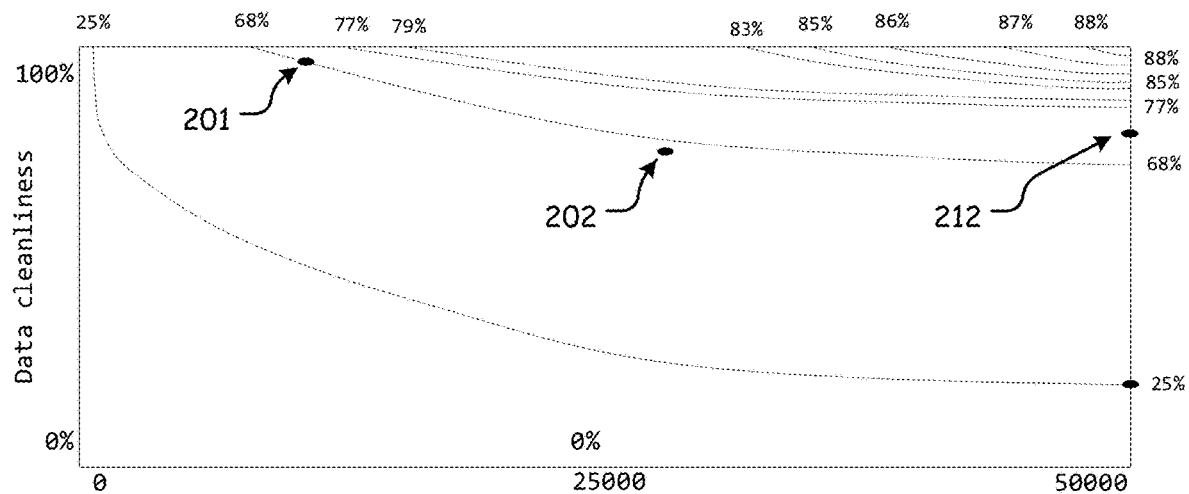
FIG. 5 is a plot like FIG. 4, with contour lines showing trained model accuracy across the chart.

FIG. 5 is a copy of FIG. 4, with heuristic contour lines added which correspond to accuracy of the trained neural network based on training data that falls along the contour line. Different models, of course, have different contour lines. Thus, for a contour line for a resulting model having accuracy of 25%, the contour line intersects the top of the chart closer to the start of the X axis, and intersects the right side of the chart at a relatively low data cleanliness level. The labeled point 201 represents a location in the chart where the model will have about 68% accuracy. The labeled point 202 represents a location in the chart where the model will have less than about 68% accuracy. The labeled point 212 represents a location in the chart where the model will have accuracy in a range between 68% and 77%. It may be desirable in a given application to use a training set that enables training a model that has accuracy above the 85% contour line in the upper right corner of the chart.

Figure 6:
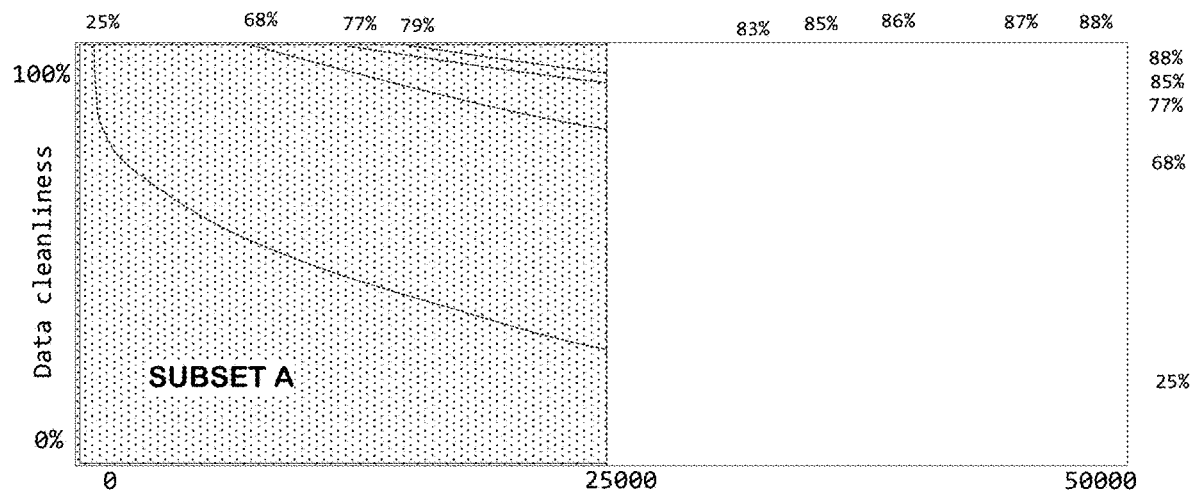
FIGS. 6 and 7 are plots like FIG. 4 illustrating Subset A and Subset B, respectively, of a labeled data set with the contour lines of FIG. 5.

FIG. 6 illustrates the effect of dividing the training data set into a first subset which is about equal to 50% of the elements. This can correspond to Subset A is referred to in the procedures shown in FIGS. 2A and 2B. This suggests that using only half of the data set, one could not achieve model accuracy greater than 85%.

Figure 7:
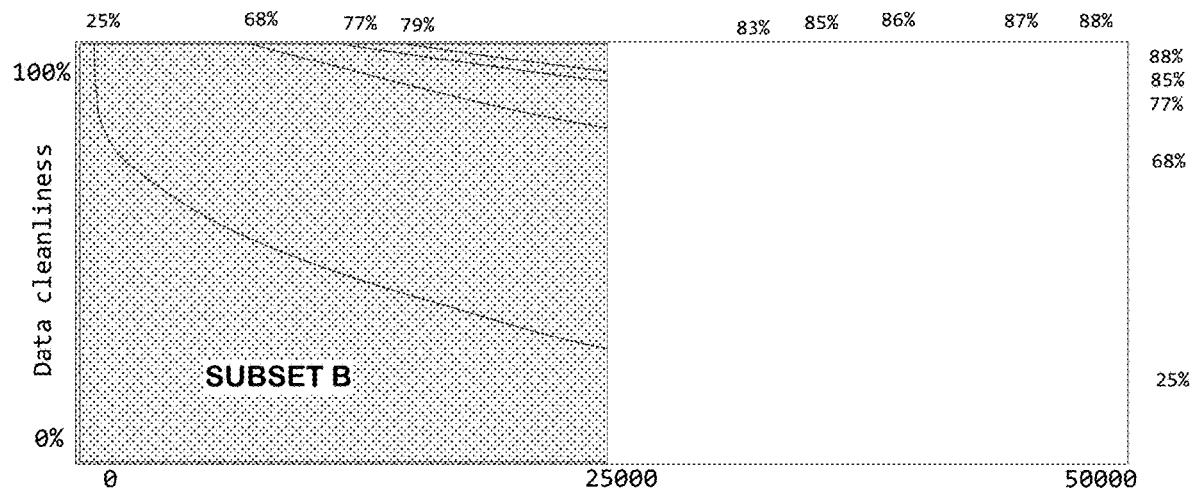

FIG. 7 illustrates Subset B generated by dividing the training set in half. Ideally, Subset A will have about the same characteristics of cleanliness as Subset B, so that the same contour lines can be applied, at least conceptually. Again, Subset B alone cannot be used in this conceptual example to achieve a high model accuracy in the range of 85% for example.

Figure 8:
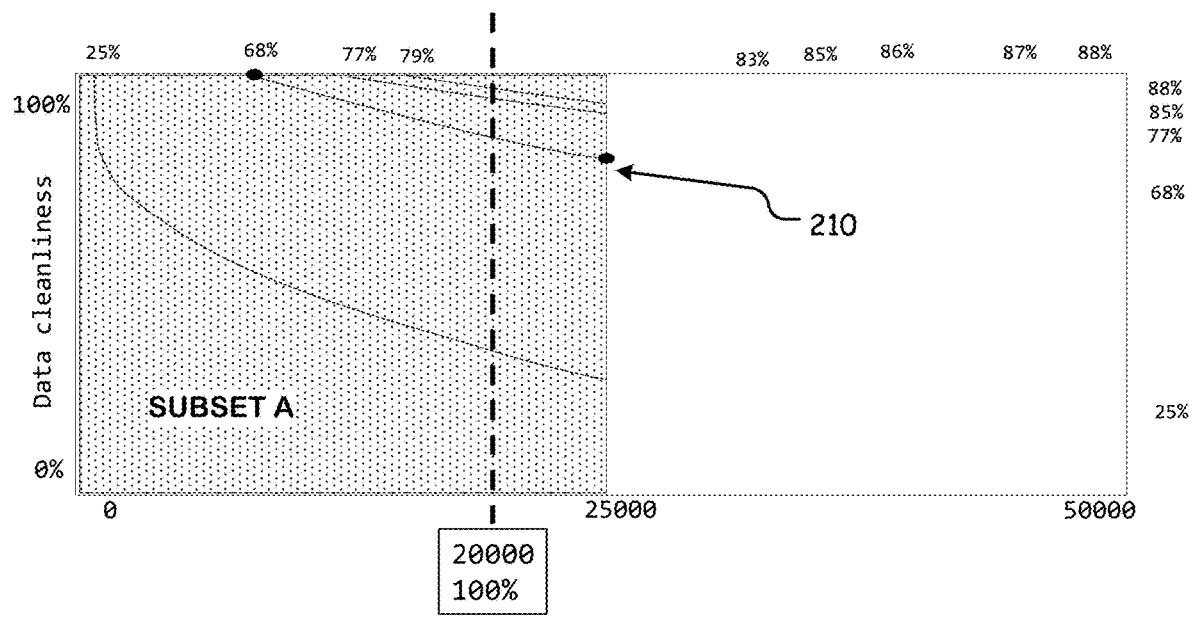
FIG. 8 illustrates Subset A of FIG. 6, with an 80% clean data condition.

FIG. 8 illustrates the effect of a data cleanliness value of about 80%. For Subset A which has 25,000 elements in this example, there are 20,000 elements that can be selected for 100% cleanliness as indicated in the diagram. Ideally, an algorithm for filtering Subset A can identify these 20,000 elements which are accurately labeled. As indicated at point 210, the accuracy of a model using a training data set with about 80% cleanliness and 25,000 elements in this example is about 68%.

Figure 9:
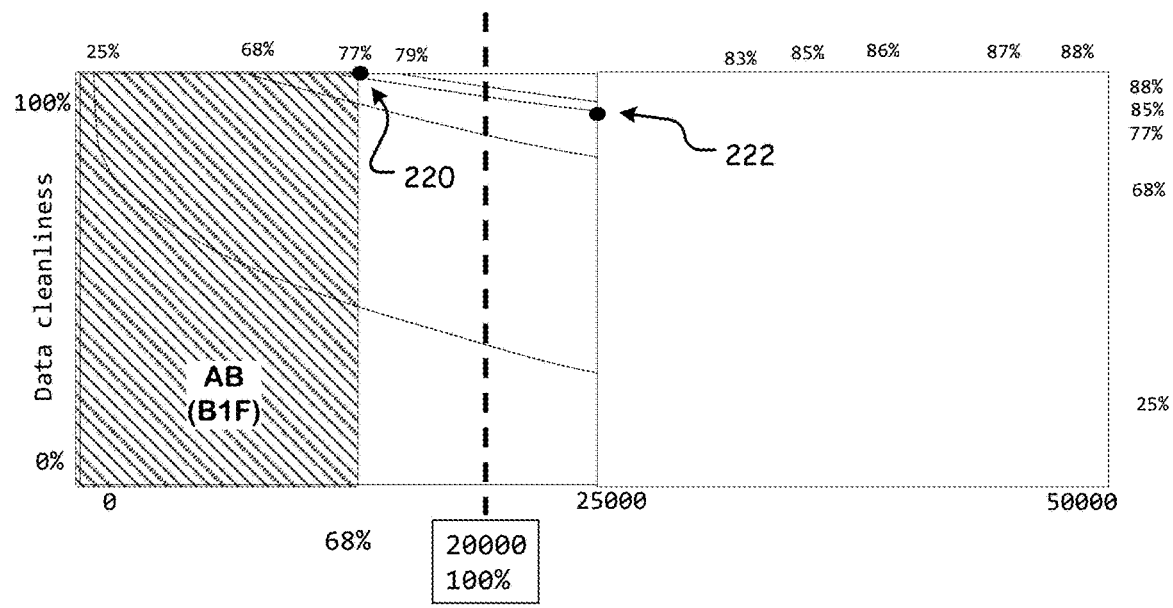
FIG. 9 illustrates a filtered Subset B1F produced as described in FIGS. 2A and 2B.

FIG. 9 illustrates a model-filtered subset B1F such as generated in the procedure of FIG. 2B for m=1. In this case, the subset A is used to train the model MODEL_A(0), and MODEL_A(0) is used to filter Subset B to produce the model-filtered subset B(1)F. As mentioned with respect to FIG. 8, the model MODEL_A(0) will have accuracy of about 68%. Thus, about 68% of subset B will be close to 99% clean data identified by filtering Subset B using MODEL_A(0). This clean data is the model-filtered subset B1F (results from cycle AB). As suggested by the contour lines in FIG. 9, this model-filtered subset B1F including 68% of the data with close to 99% accuracy, at can be expected to produce a model MODEL_B1F that has an accuracy of about 77% indicated at point 220. Point 222 indicates an accuracy level required in order to use full subset B to produce a model of 77% accuracy.

Figure 10:
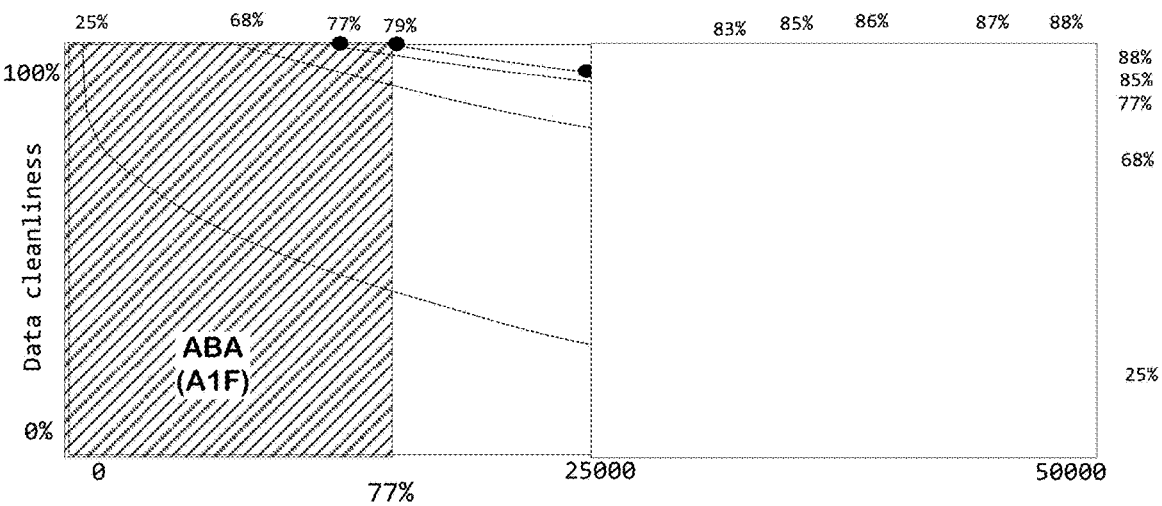
FIG. 10 illustrates a filtered Subset A1F produced as described in FIGS. 2A and 2B.

FIG. 10 illustrates a model-filtered subset A1F such as generated using MODEL_B1F in the procedure of FIG. 2B for n=1. Because MODEL_B1F has an accuracy of about 77%, the model-filtered subsets A1F will have about 77% of the elements of Subset A. This model-filtered subset A1F can be expected to produce a model MODEL_A1F with close to 79% accuracy as indicated by the contour lines.

Figure 11:
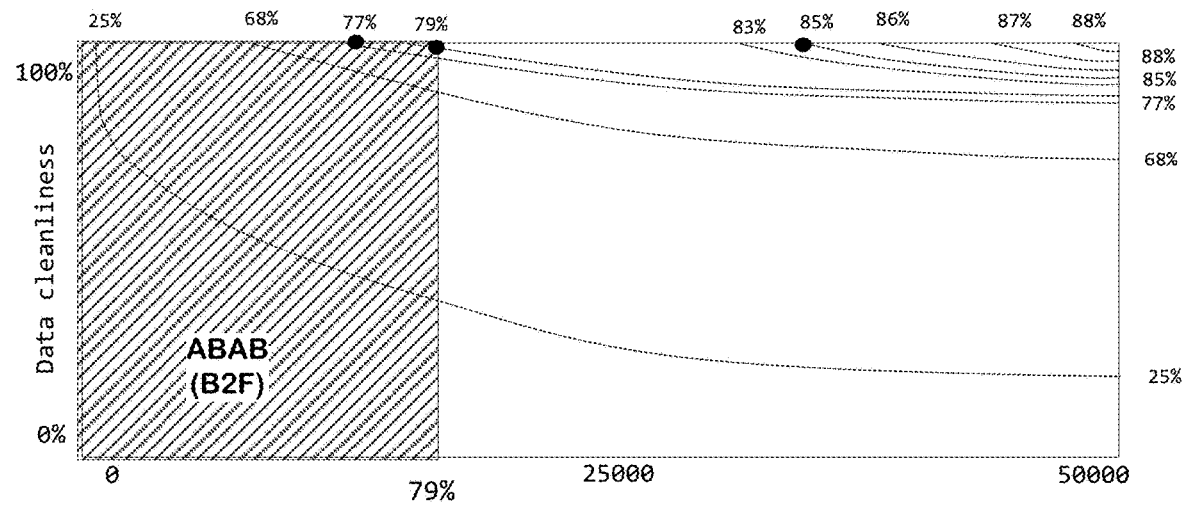
FIG. 11 illustrates a filtered Subset B2F produced as described in FIGS. 2A and 2B.

FIG. 11 illustrates a model-filtered subset B2F such as generated using MODEL_A1F in the procedure of FIG. 2B for m=2. Because MODEL_A1F has an accuracy of close to 79%, the model-filtered subset B2F will have close to 79% of the elements of Subset B. This model-filtered subset B2F can be expected to produce an improved model MODEL_B2F with close to 79% accuracy as indicated by the contour lines.

Figure 12:
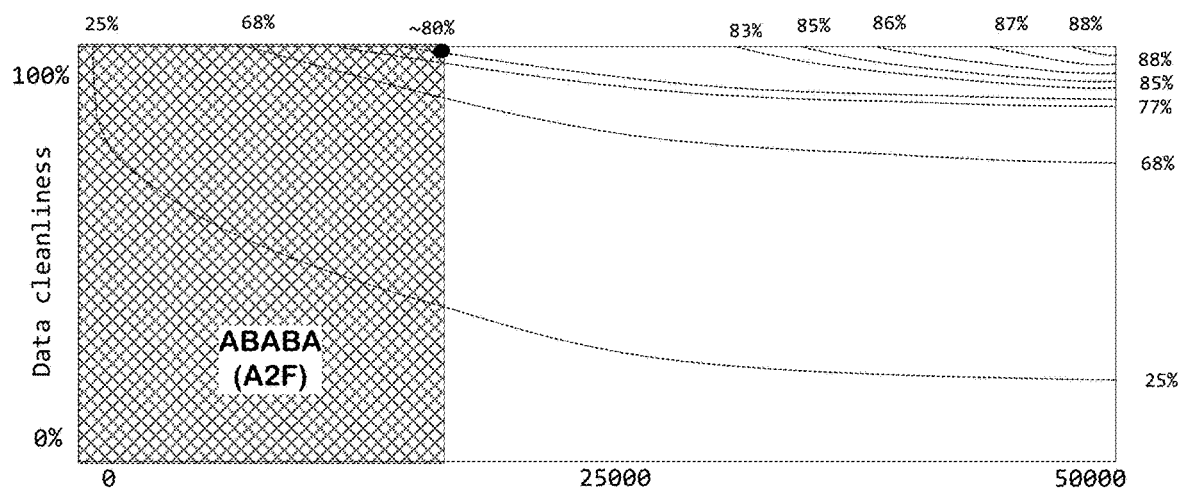
FIG. 12 illustrates a filtered Subset A2F produced as described in FIGS. 2A and 2B.

FIG. 12 illustrates a model-filtered subset A2F such as generated using MODEL_B2F in the procedure of FIG. 2B for n=2. Because MODEL_B2F has an accuracy of about 79%, the model-filtered subset A2F will have about 79% of the elements of Subset B. This model-filtered subset A2F can be expected to produce a model with about 79% (close to 80%) accuracy as indicated by the contour lines.

This cycling can continue as discussed above. However, it is seen that the number of elements in the model-filtered subsets is converging on the maximum of 80% for this training data set. So, the cycling can be stopped, and a final training set can be selected.

Figure 13:
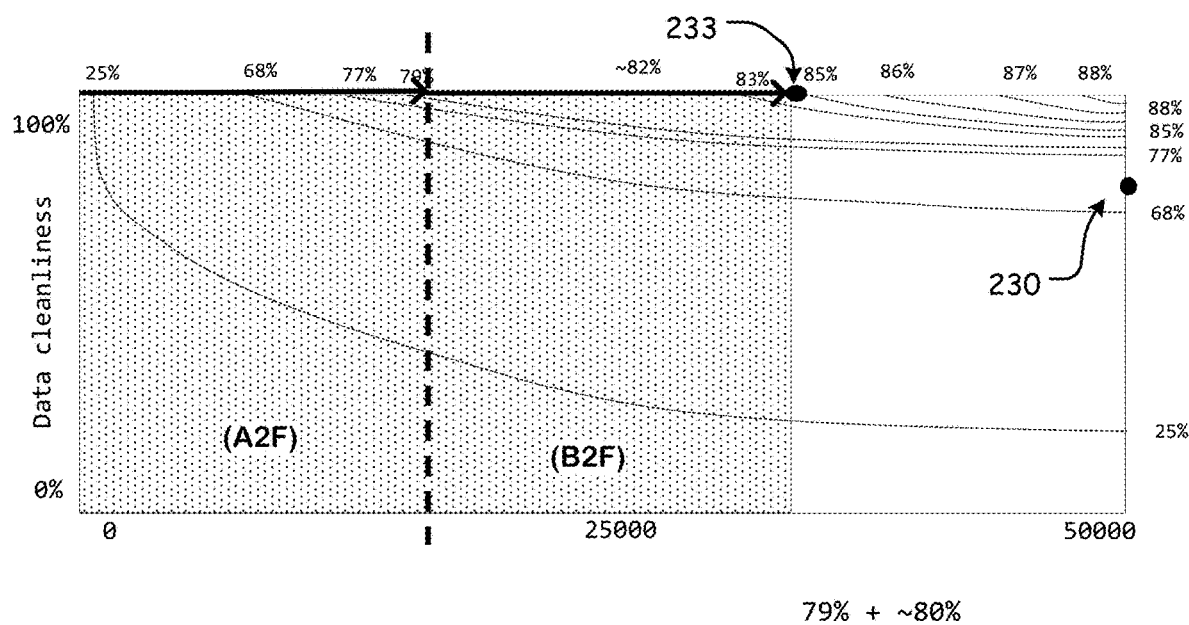
FIG. 13 illustrates combination of filtered subsets A2F and B2F, usable for training an output model.

FIG. 13 illustrates the combination of the largest refined model-filtered subset of subset A (A2F) and the largest refined model-filtered subset of subset B (B2F), which include close to 80% of the elements of subsets A and B, and has close to 99% cleanliness. As a result, an output model trained using the combination can be expected to have an accuracy of about 85% (point 233), much greater than the accuracy between 68% and 77% (point 230) estimated for a model trained using the uncleaned training set A.

Figure 14:
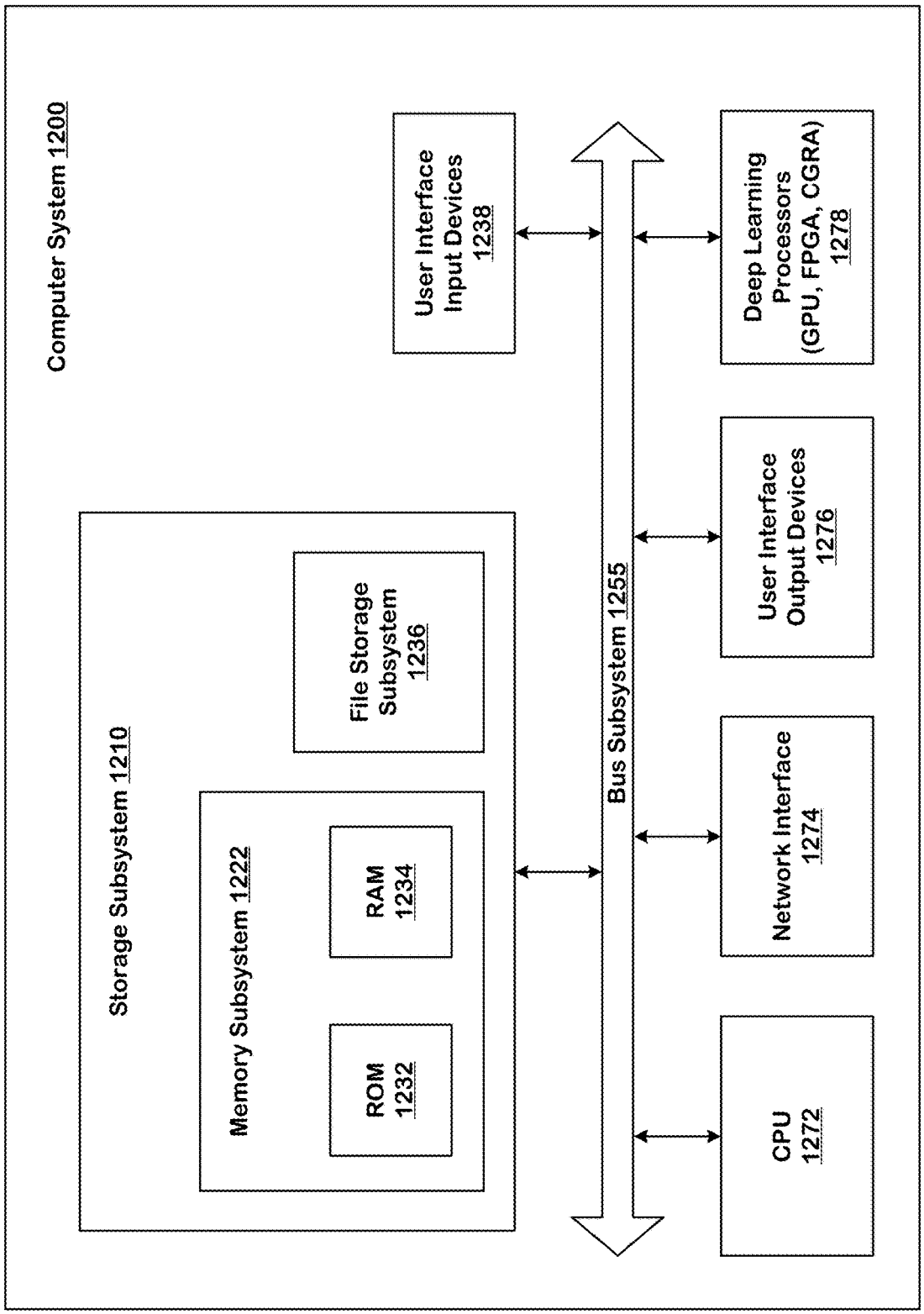
FIG. 14 is a simplified diagram of a computer system, configured as described herein.

FIG. 14 is a simplified block diagram of a computer system 1200, one or more of which in a network can be programmed to implement the technology disclosed. Computer system 1200 includes one or more central processing units (CPU) 1272 that communicate with a number of peripheral devices via bus subsystem 1255. These peripheral devices can include a storage subsystem 1210 including, for example, memory devices and a file storage subsystem 1236, user interface input devices 1238, user interface output devices 1276, and a network interface subsystem 1274. The input and output devices allow user interaction with computer system 1200. Network interface subsystem 1274 provides an interface to outside networks, including an interface to corresponding interface devices in other computer systems.

User interface input devices 1238 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1200.

User interface output devices 1276 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1200 to the user or to another machine or computer system.

Storage subsystem 1210 stores programming and data constructs that provide the functionality of some or all of the modules and methods described herein to train models for ANNs. These models are generally applied to ANNs executed by deep learning processors 1278.

In one implementation, the neural networks are implemented using deep learning processors 1278 which can be configurable and reconfigurable processors, field-programmable gate arrays (FPGAs), application-specific integrated circuits (ASICs), and/or coarse-grained reconfigurable architectures (CGRAs) and graphics processing units (GPUs) other configured devices. Deep learning processors 1278 can be hosted by a deep learning cloud platform such as Google Cloud Platform™, Xilinx™, and Cirrascale™. Examples of deep learning processors 1278 include Google's Tensor Processing Unit (TPU)™, rackmount solutions like GX4 Rackmount Series™, GX149 Rackmount Series™, NVIDIA DGX-1™, Microsoft' Stratix V FPGA™, Graphcore's Intelligent Processor Unit (IPU)™, Qualcomm's Zeroth Platform™ with Snapdragon Processors™, NVIDIA's Volta™, NVIDIA's DRIVE PX™, NVIDIA's JETSON TX1/TX2 MODULE™, Intel's Nirvana™, Movidius VPU™, Fujitsu DPI™, ARM's DynamicIQ™, IBM TrueNorth™, and others.

The memory subsystem 1222 used in the storage subsystem 1210 can include a number of memories including a main random access memory (RAM) 1234 for storage of instructions and data during program execution and a read only memory (ROM) 1232 in which fixed instructions are stored. The instructions include procedures for cleaning a training data set and procedures for training a neural network using the cleaned data set as described with reference to FIGS. 2A, 2B and 3, and with reference to FIGS. 4 to 13.

A file storage subsystem 1236 can provide persistent storage for program and data files, including the program and data files described with reference to FIGS. 2A, 2B and 3 and can include a hard disk drive, a floppy disk drive along with associated removable media, a CD-ROM drive, an optical drive, or removable media cartridges. The modules implementing the functionality of certain implementations can be stored by file storage subsystem 1236 in the storage subsystem 1210, or in other machines accessible by the processor.

Bus subsystem 1255 provides a mechanism for letting the various components and subsystems of computer system 1200 communicate with each other as intended. Although bus subsystem 1255 is shown schematically as a single bus, alternative implementations of the bus subsystem can use multiple busses.

Computer system 1200 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1200 depicted in FIG. 14 is intended only as a specific example for purposes of illustrating the preferred implementations of the present invention. Many other configurations of computer system 1200 are possible having more or less components than the computer system depicted in FIG. 14.

Embodiments of the technology described herein include computer programs stored on non-transitory computer readable media deployed as memory accessible and readable by computers, including for example, the program and data files described with reference to FIGS. 2A, 2B and 3.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

Any data structures and code described or referenced above are stored according to many implementations on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed. Many other configurations of computer system 1200 are possible having more or less components than the computer system depicted in FIG. 14.

A thin platform inference engine can include a processor such as CPU 1272, such as a microcomputer, optionally coupled with deep learning processors 1278 storing the parameters of the output trained model, and an input and output port for receiving inputs and transmitting outputs produced by executing the model. The processor may include for example, a LINUX kernel and an ANN program implemented using executable instructions stored in non-transitory memory accessible by the processor and the deep learning processors, and configured to use the model parameters, during inference operations.

A device used by, or including, an inference engine as described herein, comprises logic to implement ANN operations over input data and a trained model, where the model comprises a set of model parameters, and memory storing the trained model operably coupled to the logic, the trained set of parameters having values computed using a training algorithm that compensates for a dirty training set as described herein.

Figure 15:
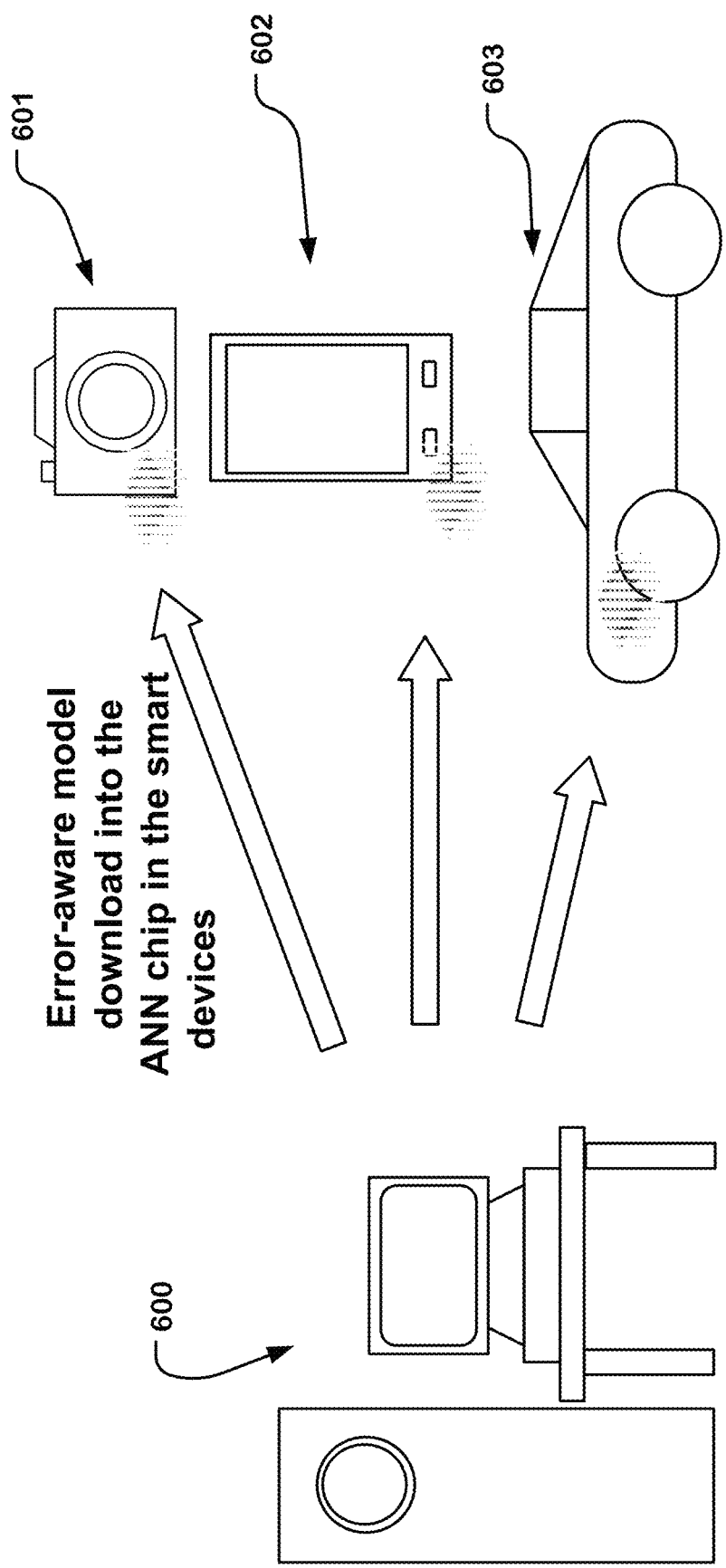
FIG. 15 illustrates embodiments of inference engines as described herein deployed in cameras, smart phones and automobiles.

FIG. 15 illustrates applications of the present technology deployed in inference engines suitable to be deployed in the field, such as in an "edge device" in an internet-of-things model. For example, a training server 600 implemented, for example, as described with reference to FIG. 14, can be deployed to produce trained sets of memory models for ANNs used in cameras 601, smart phone 602 and automobiles 603. Also, as described with reference to FIG. 2, the trained model can be applied in semiconductor manufacturing.

A number of flowcharts illustrating logic for cleaning training data sets and for training neural networks are included herein. The logic can be implemented using processors programmed using computer programs stored in memory accessible to the processors and executable by the processors, by dedicated logic hardware, including field programmable integrated circuits, and by combinations of dedicated logic hardware and computer programs. With all flowcharts herein, it will be appreciated that many of the steps can be combined, performed in parallel or performed in a different sequence without affecting the functions achieved. In some cases, as the reader will appreciate, a rearrangement of steps will achieve the same results only if certain other changes are made as well. In other cases, as the reader will appreciate, a rearrangement of steps will achieve the same results only if certain conditions are satisfied. Furthermore, it will be appreciated that the flow charts herein show only steps that are pertinent to an understanding of the invention, and it will be understood that numerous additional steps for accomplishing other functions can be performed before, after and between those shown.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A computer-implemented method for cleaning training data for a neural network, comprising:
   accessing a labeled training data set;
   using a first subset of the labeled training data set to train a first model of the neural network;
   filtering a second subset of the labeled training data set using the first model to provide a first model-filtered subset of the second subset;
   using the first model-filtered subset of the second subset to train a first refined model of the neural network;
   filtering the first subset using the first refined model to provide a first refined model-filtered subset of the first subset;
   using the first refined model-filtered subset of the first subset to train a second refined model of the neural network; and
   filtering the second subset of the labeled training data set using the second refined model to provide a second refined model-filtered subset of the second subset.

2. The method of claim 1, including:
   combining the first refined model-filtered subset of the first subset and the second refined model-filtered subset of the second subset to provide a filtered training set, training an output model of a target neural network using the filtered training set, and saving the output model in memory.

3. The method of claim 1, wherein the second refined model-filtered subset has a greater number of elements than the first model-filtered subset.

4. The method of claim 1, wherein the first subset and the second subset do not overlap.

5. The method of claim 1, wherein said filtering the first subset using the first refined model includes:
   executing the neural network using the first refined model over the first subset to produce classification data classifying data elements of the first subset; and
   selecting data elements of the first subset having labels matching the classification data to provide the first refined model-filtered subset of the first subset.

6. The method of claim 2, further including loading the output model in an instance of the target neural network in an inference engine.

7. The method of claim 1, including iteratively:
   (i) using a previously provided refined model-filtered subset of one of the first subset and the second subset to train an instant refined model of the neural network;
   (ii) filtering another of the first subset and the second subset using the instant refined model to provide an instant refined model-filtered subset of the other of the first subset and the second subset; and (iii) determining whether an iteration criterion is met, and if not, then executing (i) to (iii), and if so, then using a combination of a selected one of the refined model-filtered subsets of the first subset and a selected one of the refined model-filtered subsets of the second subset to produce a trained model for the neural network.

8. The method of claim 7, further including loading the trained model in an instance of the neural network in an inference engine.

9. A computer system configured to clean training data for a neural network, comprising:

one or more processors and memory storing computer program instructions configured to execute a process comprising:

accessing a labeled training data set;

using a first subset of the labeled training data set to train a first model of the neural network;

filtering a second subset of the labeled training data set using the first model to provide a first model-filtered subset of the second subset;

using the first model-filtered subset of the second subset to train a first refined model of the neural network;

filtering the first subset using the first refined model to provide a first refined model-filtered subset of the first subset;

using the first refined model-filtered subset of the first subset to train a second refined model of the neural network; and filtering the second subset of the labeled training data set using the second refined model to provide a second refined model-filtered subset of the second subset.

10. The system of claim 9, the process including:

combining the first refined model-filtered subset of the first subset and the second refined model-filtered subset of the second subset to provide a filtered training set, training an output model of a target neural network using the filtered training set, and saving the output model in memory.

11. The system of claim 9, wherein the second refined model-filtered subset has a greater number of elements than the first model-filtered subset.

12. The system of claim 9, wherein said filtering the first subset using the first refined model includes:

executing the neural network using the first refined model over the first subset to produce classification data classifying data elements of the first subset; and selecting data elements of the first subset having labels matching the classification data to provide the first refined model-filtered subset of the first subset.

13. The system of claim 9, the process including iteratively:

(i) using a previously provided refined model-filtered subset of one of the first subset and the second subset to train an instant refined model of the neural network;

(ii) filtering another of the first subset and the second subset using the instant refined model to provide an instant refined model-filtered subset of the other of the first subset and the second subset; and (iii) determining whether an iteration criterion is met, and if not, then executing (i) to (iii), and if so, then using a combination of a selected one of the refined model-filtered subsets of the first subset and a selected one of the model-filtered subsets of the second subset to produce a trained model for a target neural network.

14. The system of claim 13, the process including loading the trained model in an instance of the target neural network in an inference engine.

15. A computer program product configured to support cleaning training data for a neural network, comprising a non-transitory computer readable memory storing computer program instructions configured to execute a process comprising:

accessing a labeled training data set;

using a first subset of the labeled training data set to train a first model of the neural network;

filtering a second subset of the labeled training data set using the first model to provide a first model-filtered subset of the second subset;

using the first model-filtered subset of the second subset to train a first refined model of the neural network;

filtering the first subset using the first refined model to provide a first refined model-filtered subset of the first subset;

using the first refined model-filtered subset of the first subset to train a second refined model of the neural network; and filtering second subset of the labeled training data set using the second refined model to provide a second refined model-filtered subset of the second subset.

16. The computer program product of claim 15, wherein the second refined model-filtered subset has greater number of elements than the first model-filtered subset.

17. The computer program product of claim 15, wherein the first subset and the second subset do not overlap.

18. The computer program product of claim 15, the process including iteratively:

(i) using a previously provided refined model-filtered subset of one of the first subset and the second subset to train an instant refined model of the neural network;

(ii) filtering another of the first subset and the second subset using the instant refined model to provide an instant refined model-filtered subset of the other of the first subset and the second subset; and (iii) determining whether an iteration criterion is met, and if not, then executing (i) to (iii), and if so, then using a combination of a selected one of the refined model-filtered subsets of the first subset and a selected one of the model-filtered subsets of the second subset to produce a trained model for the neural network.

19. The computer program product of claim 18, the process including loading the trained model in an instance of the neural network in an inference engine.

20. The computer program product of claim 15, wherein said filtering the first subset using the first refined model includes:

executing the neural network using the first refined model over the first subset to produce classification data classifying data elements of the first subset; and selecting data elements of the first subset having labels matching the classification data to provide the first refined model-filtered subset of the first subset.

* * * * *